July 24, 1923.
C. M. ANDREWS
1,463,029
COMBINED TROLLEY FROG AND ELECTRIC CUT-OUT
Filed June 2, 1922
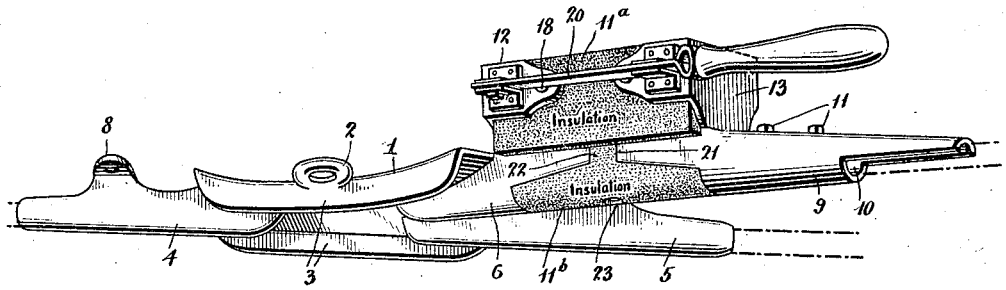
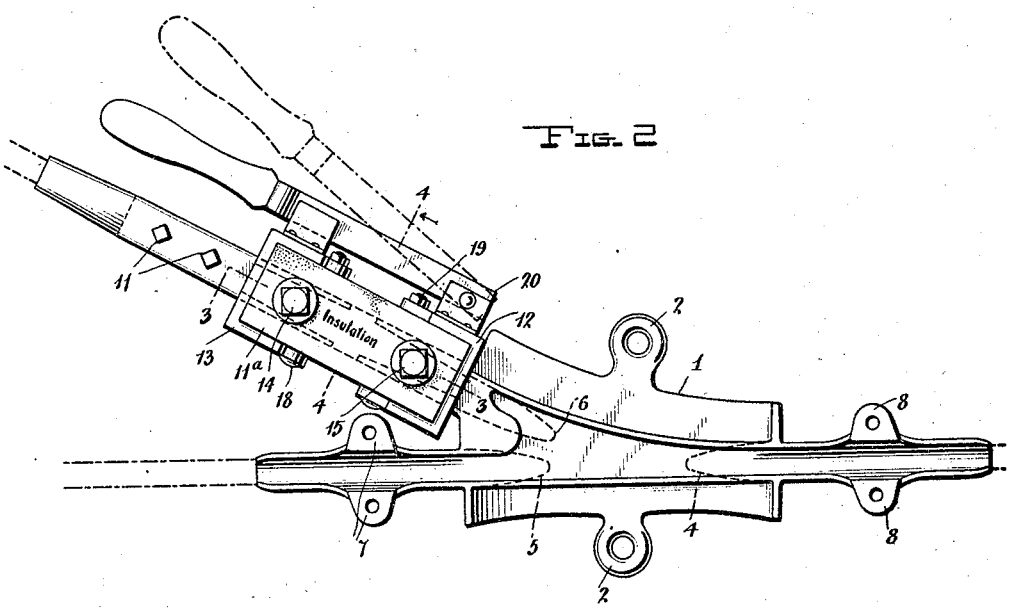
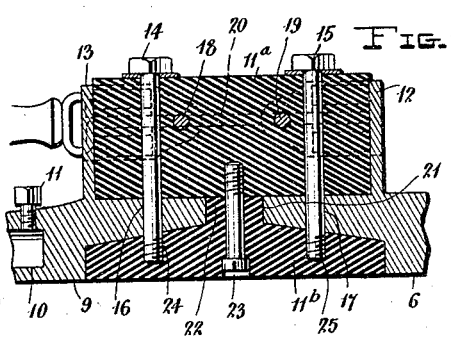
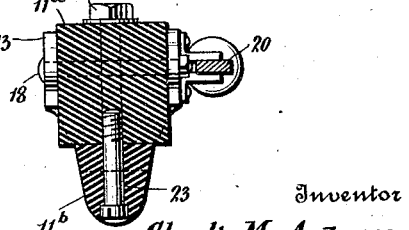
Inventor
Charlie M. Andrews,
By *[signature]*
Attorney Patented July 24, 1923.

1,463,029

UNITED STATES PATENT OFFICE.

CHARLIE M. ANDREWS, OF CARYVILLE, TENNESSEE, ASSIGNOR OF ONE-HALF TO G. EDWARD MOORE, OF CARYVILLE, TENNESSEE.

COMBINED TROLLEY FROG AND ELECTRIC CUT-OUT.

Application filed June 2, 1922. Serial No. 565,479.

To all whom it may concern:

Be it known that I, CHARLIE M. ANDREWS, a citizen of the United States, residing at Caryville, in the county of Campbell and State of Tennessee, have invented new and useful Improvements in Combined Trolley Frogs and Electric Cut-Outs, of which the following is a specification.

This invention relates to a combined trolley frog and electric cut-out and contemplates the construction of a unitary device of the character described in which are realized all the advantages both of manufacture and of use which accrue in the making of the frog and cut-out as a single unit. Among these advantages are cheapness in cost and simplicity of design, the frog plate serving as the support for the cut-out, and efficiency in installation since it eliminates the necessity of cutting the trolley wire for the insertion of the cut-out.

Another object of the invention is the provision of a divided frog plate each part of which is formed with a frame or bracket for the reception of an insulating block, the latter separating the parts electrically and at the same time serving as a tension member by which said parts are held together, there being a second insulator, separable from the one aforementioned, and readily replaceable, shaped to conform to the contour of the trolley wheel track which is bridged by the cut-out so as to afford a continuous but non-conductive guide for the trolley wheel which may be quickly and inexpensively renewed when worn.

With the above and other objects in view, my invention consists in the improved combined trolley frog and electric cut-out illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:—

Figure 1 is a pictorial view of the combined trolley frog and cut-out.

Figure 2 is a plan view of the device shown in Figure 1.

Figure 3 is a detail view showing the insulating portions of the device taken along the line 3—3 of Figure 2.

Figure 4 is a sectional view taken along the line 4—4 of Figure 2 and viewed from the direction of the arrow.

Referring now in detail to the several figures, the numeral 1 represents the frog plate which is provided with integral perforated lugs 2 at the sides by means of which the frog plate is suspended by the cross wires in an over-head trolley system. Said frog plate is flanged at both sides on its under surface as shown at 3 and provided at one end with the single trolley track 4 and at its other end with the divergent trolley tracks 5 and 6. One of said divergent trolley tracks, namely the one represented by the numeral 5 is in alignment with the single trolley track 4, both of which tracks are concave on their upper sides for the reception of the main line trolley wire which passes through the frog plate unbroken. Perforated lugs 7 and 8 are provided at the sides of the groove portions of the trolley tracks 5 and 4 to which suitable top plates, not shown are secured, in any known manner, by means of which the frog plate is maintained in fixed relation to the main line trolley wire.

The frog plate is divided into two portions one of which carries integral with itself the features just described, while the other portion 9 is provided with a socket 10 in which the branch line trolley wire is inserted and held in place by the set screws 11. The usual expedient of tamping the sides of the grooves around the trolley wires may, if desired, be resorted to for the purpose of adding reinforcement to the positive securing means herein described. The portion 9 of the frog plate forms a continuation of the trolley track 6, said parts being electrically isolated from one another by the insulators 11$^a$ and 11$^b$.

The insulator 11$^a$ is herein shown as being in the form of a rectangular prism and seated within a recess formed by three-sided brackets 12 and 13 which are carried respectively as integral parts of the portions 1 and 9 of the frog plate. The insulator 11$^a$ is secured to the two parts of the frog plate by means of bolts 14 and 15 which extend through apertures 16 and 17 respectively in said portions of the frog plate and by means of the horizontally disposed bolts 18 and 19 which pass through the sides of said brackets and through the insulator. By this construction said insulator is arranged to act as a tension member holding rigidly together the respective portions of the frog plate which are attached to the main and branch line trolley wires, the bolts running through said insulator in perpendicular planes acting efficiently to distribute the tensile stress through said insulator and minimize the liability of disruption of the latter through excessive strain.

A knife switch 20 bridges the space between the brackets 12 and 13 across said insulator and electrically connects the portions 1 and 9 of the frog plate when said knife switch is closed.

The branch line trolley track which is constituted by the elements 6 and 9 is separated at a point 21 beneath the insulator 11$^a$, the space between said elements being filled by the upwardly projecting end 22 of the insulator 11$^b$. Said insulator is elongated in character as shown in Figure 3, and so shaped as to preserve the smooth continuous contour of the adjacent portion of the trolley track elements 6 and 9, the latter being suitably recessed to accommodate said insulator. The insulator 11$^b$ is centrally bored at 23 for the reception of a screw which penetrates into the insulator 11$^a$ and engages a threaded socket in the latter. To prevent rotation of the insulator 11$^b$ around said screw, the bolts 14 and 15 pass through the webs of metal formed by the recesses in which are seated the upper and lower insulators and are projected into threaded sockets 24 and 25 adjacent the ends of said insulator. It is within the scope of the invention, if desired, to rely solely upon either the bolts 24 and 25 or upon the bolt 23 as the means for securing the insulator 11$^b$ in place.

It is obvious from an inspection of Figure 3 that the insulator 11$^a$ is not subject to wear and need never be replaced for that cause. The material of which said insulator is made need be chosen with consideration only for its qualities as an insulator and for its tensile strength without regard to its durability or cost, which permits the use of the best insulating material even though it is the more expensive, since it is not subject to wear and will not have to be replaced. The insulator 11$^b$, on the contrary is called upon merely to provide a bridge of insulation over which the trolley wheel must pass in travelling from the portion 1 of the frog plate to the portion 9. The paramount qualifications of this insulator is therefore that of durability and the material of which it is composed may be selected without regard to any other characteristic. This insulator should be made of a material which is so relatively cheap that its replacement becomes a matter of merely nominal expense. The element of ease in installation has also received due consideration in the working out of this invention, and in replacing the insulator 11$^b$ it is not necessary that the branch line trolley wire shall be disconnected from the main line trolley wire as is the custom under the present practice. In order to replace the insulator 11$^b$ it is merely necessary that the bolts 14 and 15 be backed out of the sockets 24 and 25, and that the screw 23 be released from the threaded socket in the insulator 11$^a$. The tension member 11$^a$ is not disturbed either in the removal or the replacement of the insulator 11$^b$. It is only necessary that the insulator 11$^b$ be secured into place by the central screw 23 and that the bolts 14 and 15 be again advanced into the threaded sockets 24 and 25 in the insulator 11$^b$.

It will be understood that various changes may be made in the form and relation of parts to suit different requirements of use, and that the invention, therefor, is not limited to the precise details of construction and arrangement shown.

Having described my invention what I claim as new and desire to secure by Letters Patent is:—

1. A combined trolley frog and electrical cut-out comprising a divided frog plate carrying a trolley track and formed with upper and lower recesses adjacent its point of division, said recesses defining intermediate metallic webs electrically separated, said lower recess interrupting the continuity of said trolley track, an insulator seated in the upper recess, functioning as a tension member for holding the divided parts of said frog plate together, a second insulator seated in said lower recess, means for securing said first insulator and a part of said frog plate together, said means engaging said second insulator.

2. A combined trolley frog and electrical cut-out comprising a divided frog plate carrying a trolley track and formed with upper and lower recesses adjacent its point of division, said recesses defining intermediate metallic webs electrically separated, said lower recess interrupting the continuity of said trolley track, an insulator seated in the upper recess, functioning as a tension member for holding the divided parts of said frog plate together, a second insulator seated in said lower recess, means for securing said first insulator and a part of said frog plate together, said means passing into said second insulator.

3. A combined trolley frog and electrical cut-out comprising a divided frog plate carrying a trolley track and formed with upper and lower recesses adjacent its point of division defining between them intermediate metallic webs electrically separated, said lower recess interrupting the continuity of said trolley track, an insulator seated in the upper recess functioning as a tension member for holding the divided parts of said frog plate together, a second insulator seated in said lower recess, forming part of the trolley track, means for securing said first insulator to a part of said frog plate, said means passing through one of said webs into engagement with said second insulator.

4. A combined trolley frog and electrical cut-out comprising a divided frog plate carrying a trolley track and formed with upper and lower recesses adjacent its point of division, said recesses defining intermediate metallic webs electrically separated, said lower recess interrupting the continuity of said trolley track, an insulator seated in the upper recess, functioning as a tension member for holding the divided parts of said frog plate together, a second insulator removably seated in said lower recess, means for securing said first insulator and a part of said frog plate together, said means engaging said second insulator.

5. A combined trolley frog and electrical cut-out comprising a divided frog plate carrying a trolley track and formed with upper and lower recesses adjacent its point of division, said recesses defining intermediate metallic webs electrically separated, said lower recess interrupting the continuity of said trolley track, an insulator seated in the upper recess, functioning as a tension member for holding the divided parts of said frog plate together, a second insulator seated in said lower recess, means for securing said first insulator and a part of said frog plate together, said means engaging said second insulator, and a switch for bridging said insulator.

6. A combined trolley frog and electrical cut-out comprising a divided frog plate carrying a trolley track, a plurality of superposed insulators bridging the space between the parts of said frog plate, one acting as a tension member for holding said parts together, the other forming part of said trolley track, and single means engaging both insulators for securing them to said frog plate.

7. A combined trolley frog and electrical cut-out comprising a frog plate provided with a trolley track and divided intermediate the ends of said trolley track, brackets carried by the adjacent ends of said divided portions, an insulator seated within said brackets and functioning as a tension member to hold said portions together, bolts passing transversely through said brackets and insulator, other bolts passing through said insulator perpendicularly to said first mentioned bolts, a switch secured to said brackets and bridging said insulator, a second insulator interposed between the divided ends of said trolley track, means for removably securing said second insulator to the first insulator, said other bolts passing into said second insulator to prevent rotational displacement of the latter.

In testimony whereof I have hereunto set my hand in presence of two subscribing witnesses.

CHARLIE M. ANDREWS.

Witnesses:
S. R. TILLER.
W. L. SHULTS.